United States Patent [19]

Campbell et al.

[11] Patent Number: 5,570,287
[45] Date of Patent: Oct. 29, 1996

[54] SPEED DEPENDENT SUSPENSION CONTROL

[75] Inventors: Douglas C. Campbell, Dearborn; Gary J. Gloceri, West Bloomfield; Daniel M. McCoy, Shelby Township, all of Mich.

[73] Assignee: Ford Motor Company, Dearborn, Mich.

[21] Appl. No.: 356,992

[22] Filed: Dec. 16, 1994

[51] Int. Cl.⁶ .................................................. B60G 17/015
[52] U.S. Cl. ...................... 364/424.05; 280/688; 280/707
[58] Field of Search ........................ 364/424.05; 280/840, 280/688, 707

[56] References Cited

U.S. PATENT DOCUMENTS

| | | | |
|---|---|---|---|
| 4,517,832 | 5/1985 | Holland et al. | 73/118 |
| 4,564,214 | 1/1986 | Tokunaga et al. | 280/707 |
| 4,575,116 | 3/1986 | Miyata | 280/707 |
| 4,591,186 | 5/1986 | Ashiba | 280/707 |
| 4,613,154 | 9/1986 | Tanaka et al. | 280/707 |
| 4,616,163 | 10/1986 | Kanai et al. | 318/611 |
| 4,621,832 | 11/1986 | Nakashima et al. | 280/707 |
| 4,650,212 | 3/1987 | Yoshimura | 280/707 |
| 4,652,010 | 3/1987 | Sugasawa | 280/707 |
| 4,765,649 | 8/1988 | Ikemoto et al. | 280/707 |
| 4,801,155 | 1/1989 | Fukushima et al. | 280/707 |
| 4,803,627 | 2/1989 | Yasuike et al. | 364/424.05 |
| 4,822,063 | 4/1989 | Yopp et al. | 280/840 |
| 4,827,416 | 5/1989 | Kawagoe et al. | 364/424.05 |
| 4,830,394 | 5/1989 | Tanaka et al. | 280/689 |
| 4,846,496 | 7/1989 | Tanaka et al. | 280/689 |
| 4,853,860 | 8/1989 | Achenbach | 364/424.05 |
| 4,903,982 | 2/1990 | Harara et al. | 280/707 |
| 4,930,082 | 5/1990 | Harara et al. | 364/424.05 |
| 4,943,084 | 7/1990 | Fukunaga et al. | 280/707 |
| 5,016,907 | 5/1991 | Akatsu et al. | 280/707 |
| 5,072,392 | 12/1991 | Taniguchi | 364/424.05 |
| 5,083,275 | 1/1992 | Kawagoe et al. | 364/424.05 |
| 5,083,454 | 1/1992 | Yopp | 73/118.1 |
| 5,144,558 | 9/1992 | Fukushima et al. | 364/424.05 |
| 5,144,559 | 9/1992 | Kamimura et al. | 364/424.05 |
| 5,381,335 | 1/1995 | Wolf | 364/424.05 |
| 5,384,705 | 1/1995 | Inagaki et al. | 364/424.05 |

FOREIGN PATENT DOCUMENTS

| | | |
|---|---|---|
| 416560 | 3/1991 | European Pat. Off. . |
| 4-274916 | 9/1992 | Japan . |

*Primary Examiner*—Michael Zanelli
*Attorney, Agent, or Firm*—Gregory P. Brown, Esq.; Roger L. May

[57] ABSTRACT

Vehicle speed is measured and used to calculate lateral acceleration of the vehicle and speed dependent thresholds to which the lateral acceleration of the vehicle is compared to determine when to change a controllable suspension system of the vehicle to improve operation of the suspension system. The controllable suspension system includes air springs and variable damping shock absorbers switchable between soft and firm damping rates. At speeds above a given speed, lateral accelerations exceeding first speed dependent thresholds will result in switching the shock absorbers to firm and/or closing gate valves which intercouple the left and right air springs to decrease vehicle roll. For slower speeds less than the given speed, the suspension system control is desensitized such that lateral accelerations of the same given magnitudes, for example due to entering a parking space or other low speed maneuver, do not alter the suspension. Switch back of shock absorbers from firm to soft and opening of the gate valves can be based on expiration of an elapsed time period or detection of the lateral acceleration of the vehicle falling below second speed determined thresholds.

18 Claims, 3 Drawing Sheets

5,570,287

SPEED DEPENDENT SUSPENSION CONTROL

BACKGROUND OF THE INVENTION

The present invention relates in general to motor vehicle suspension systems which include variable damping shock absorbers and controllable springs, for example air springs, and, more particularly, to a speed dependent method for controlling;the shock absorbers and springs.

Motor vehicle suspension systems are connected between the body of the vehicle and the wheels to determine the ride and handling of the vehicle. Conventional suspension systems include springs and shock absorbers which are fixed such that the ride and handling are fixed as well.

More advanced suspension systems include controllable elements such as variable damping shock absorbers which permit two or more damping factors to be selected as needed. Controllable springs may also be included. Such springs are typically pneumatically or air controlled and are inflated to increase the spring rate of the overall vehicle spring system and deflated to decrease the spring rate.

In prior art suspension systems, the shocks and springs may be manually controlled by the operator of the vehicle. Automatic control is also utilized to control the shocks and springs in response to inputs from the vehicle as well. For example, the lateral acceleration of the vehicle may be determined and compared to a threshold to determine whether to make adjustments to the vehicle suspension. Unfortunately, known prior art systems do not utilize the relation of the speed of the vehicle to lateral acceleration in making suspension adjustment decisions. Accordingly, there is a need for an improved suspension control system which includes vehicle speed in making suspension control decisions based on lateral acceleration to eliminate the compromises which are made in the prior art between low speed performance and high speed performance.

SUMMARY OF THE INVENTION

This need is met by the invention of the present application wherein vehicle speed is measured and used to calculate lateral acceleration of the vehicle and also at least one speed dependent threshold to which the lateral acceleration of the vehicle is compared to determine when changes should be made to a controllable suspension system of the vehicle to improve operation of the suspension system. More particularly, the controllable suspension system includes air springs and shock absorbers, the damping of which can be adjusted at least between soft and firm damping rates. At speeds above a given speed, lateral accelerations exceeding first speed dependent thresholds will result in changes to the suspension. For slower speeds less than the given speed, the suspension system control is desensitized such that lateral accelerations of the same given magnitudes, for example due to entering a parking space or other low speed maneuver, do not alter the suspension.

In particular, a speed dependent lateral acceleration damping threshold is determined and the shock absorbers are switched to a firm or firmer setting if lateral acceleration exceeds the determined lateral acceleration damping threshold. Switch back to a soft or softer setting preferably is performed after expiration of a given time period. However, switch back to a soft or softer setting can also be performed in response to lateral acceleration falling below a switch back lateral acceleration damping threshold.

In addition, air springs positioned at each corner of the vehicle are normally isolated front to back with the front air springs being intercoupled and the rear air springs being intercoupled through front and rear gate solenoid valves, respectively. A speed dependent lateral acceleration gating threshold is determined and, if lateral acceleration exceeds the determined lateral acceleration gating threshold, the gate valves are closed to eliminate the transfer of air from side to side of the vehicle allowing a pressure differential to be generated. In a turn, the increased pressure in the two outermost shock absorbers raises the two outer wheel spring rates, decreasing vehicle roll. The gate valves preferably are reopened after expiration of a given time period. However, reopening of the gate valves can also be performed in response to lateral acceleration falling below a gate valve open lateral acceleration gating threshold.

In accordance with one aspect of the present invention, a method for operating a controllable suspension connected between a body and wheels of a vehicle comprises the steps of: sensing the speed of the vehicle; determining a lateral acceleration damping threshold for switching a damping factor of the controllable suspension in response to the sensed speed of the vehicle; determining the lateral acceleration of the vehicle; comparing the determined lateral acceleration of the vehicle to the lateral acceleration damping threshold; and, setting the damping factor of the controllable suspension in response to the result of the step of comparing the determined lateral acceleration of the vehicle to the lateral acceleration damping threshold.

In accordance with another aspect of the present invention, a method for operating a controllable suspension connected between a body and wheels of a vehicle comprises the steps of: sensing the speed of the vehicle; determining a lateral acceleration gating threshold for switchably isolating a left side of the controllable suspension from a right side of the controllable suspension; determining the lateral acceleration of the vehicle; comparing the determined lateral acceleration of the vehicle to the gating threshold; and, controlling the isolation of the left side of the controllable suspension from the right side of the controllable suspension in response to the step of comparing the determined lateral acceleration of the vehicle to the gating threshold.

In the illustrated embodiment, the step of determining a lateral acceleration damping threshold comprises the steps of solving a first damping equation if the sensed speed of the vehicle is less than or equal to a first speed, and solving a second damping equation if the sensed speed of the vehicle is greater than the first speed. Of course, more than one speed could be used in the present invention to define more than two speed ranges.

Also, the step of determining the lateral acceleration of the vehicle comprises the steps of sensing an angular position of a steering wheel of the vehicle, and combining the sensed angular position of the steering wheel with the sensed speed of the vehicle to determine the lateral acceleration of the vehicle.

In a manner similar to that used for determining the lateral acceleration damping threshold, the step of determining a lateral acceleration gating threshold comprises the steps of solving a first gating equation if the sensed speed of the vehicle is less than or equal to a first speed, and solving a second gating equation if the sensed speed of the vehicle is greater than the first speed. Here again, more than one speed could be used in the present invention to define more than two speed ranges.

It is a feature of the present invention to provide an improved suspension control system which includes vehicle speed in making suspension control decisions based on lateral acceleration; to provide an improved suspension control system wherein vehicle speed is used to calculate thresholds which are used to determine whether suspension changes are desirable; and, to provide an improved suspension control system wherein vehicle speed is used to calculate thresholds and vehicle lateral acceleration which are utilized to determine whether suspension changes are desirable.

Other features and advantages of the invention will be apparent from the following description, the accompanying drawings and the appended claims.

DETAILED DESCRIPTION OF THE INVENTION

Figure 1:
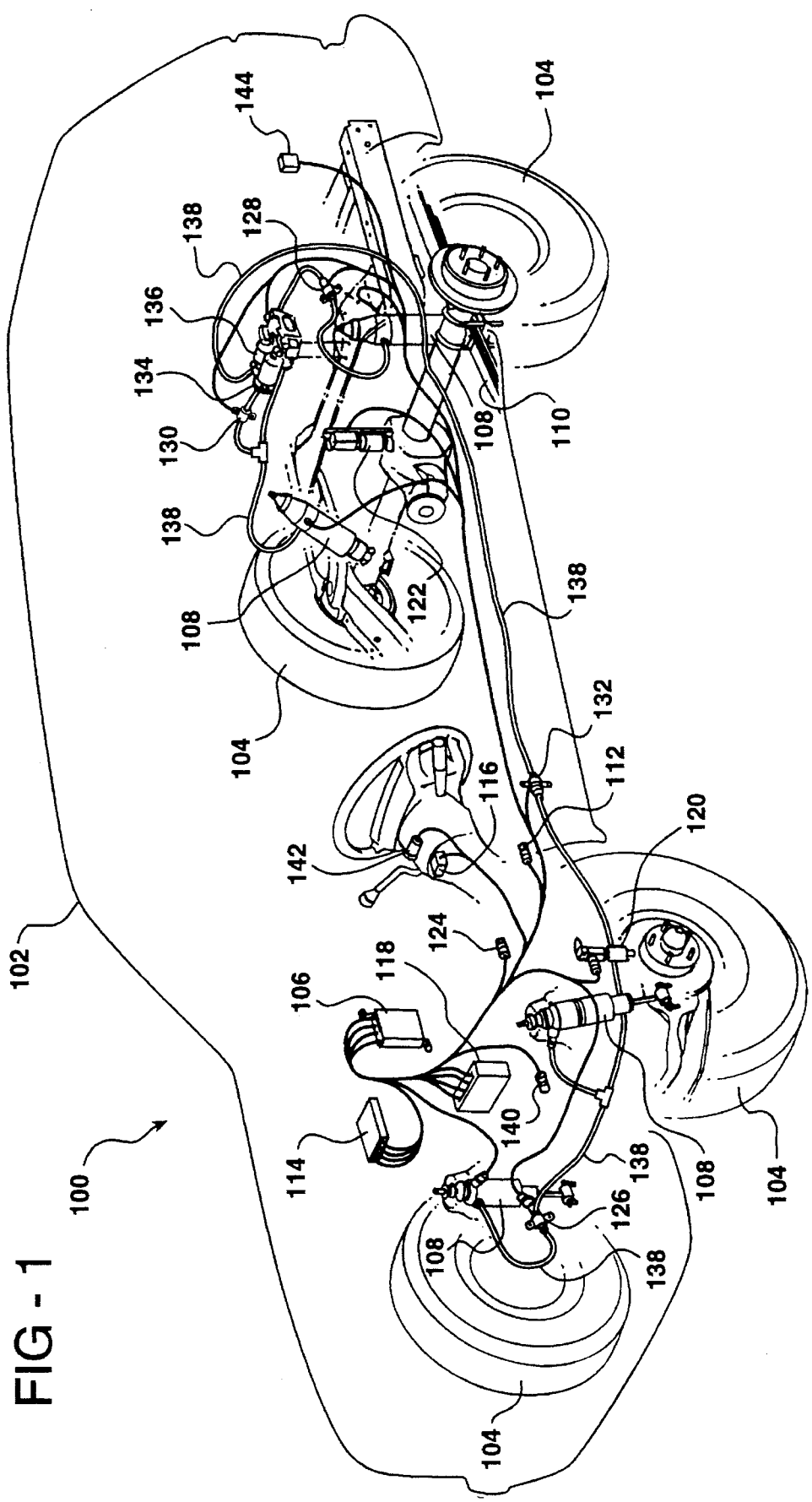
FIG. 1 is a perspective view of a vehicle, with the body shown in outline, including a controllable suspension system operable in accordance with the present invention.

The invention of the present application will be described with reference to a vehicle 100 and, more particularly, to a controllable suspension connected between a body 102 and wheels 104 of the vehicle 100 as illustrated in FIG. 1. The vehicle 100 includes an automatic ride control system having a computer controller 106 which controls the various components of the suspension. The four corners of the vehicle are controlled, in part, by two stage, firm and soft, shock absorbers 108 to provide a smooth ride for normal driving without sacrificing handling performance. An air spring integral with each shock absorber 108 permits load leveling and vehicle height adjustment over a span of approximately 50 mm (2 inches). Of course, air springs and shock absorbers which are separate from one another could be used for the suspension.

A smooth ride is achieved through selection of lower rate front torsion bars, not shown, and rear leaf springs 110, front and rear anti-roll bars, not shown, and selection of soft damping for the shock absorbers 108. Handling performance is maintained by reading driver and road inputs that, under certain conditions, switch the damping rate of the shock absorbers 108 to firm, minimizing body movement. Driver inputs may include: braking, monitored via a brake switch 112; throttle position, monitored via a primary engine control computer 114; steering rate and position, monitored via a steering sensor 116; and, since the illustrated vehicle 100 includes a selectable four wheel drive capability, transfer case setting, monitored via an electronic module 118. Road inputs are sensed by a vehicle speed indicator 124 located near an output shaft of a transmission, not shown, of the vehicle 100 and two suspension mounted height sensors, a front height sensor 120 and a rear height sensor 122.

The automatic ride control system controls the height of the vehicle 100 on the front and rear axles separately through the use of an air compressor 136, air lines 138, and five solenoid valves: a front gate solenoid valve 126; a rear gate solenoid valve 128; a rear fill solenoid valve 130; a front fill solenoid valve 132; and, a vent solenoid valve 134. The vent solenoid valve 134 is located in a cylinder head of the air compressor 136. The compressor 136 is controlled via a compressor relay 140.

Enclosed in each of the shock absorbers 108 is an air spring and a mechanism that enables switching between soft and firm damping. The air spring integrated into each of the shock absorbers 108 is capable of independently raising and lowering each corner of the vehicle 100 based on the pressure and volume of air supplied to it. The automatic ride control system regulates the pressure in each air spring by compressing and venting the air provided to it. As earlier noted, the air springs and shock absorbers 108 could be separate from one another. Further, since a variety of mechanisms are known for switching the damping rate of shock absorbers for motor vehicles, the shock absorbers will not be described in detail herein.

The air compressor 136 is connected to the shock absorbers 108 via the solenoid valves 126–132 and the air lines 138. The front shock absorbers 108 are controlled via the front fill solenoid valve 132 and the front gate solenoid valve 126. When the front fill solenoid valve 132 and the front gate solenoid valve 126 are energized, air pressure to the front shock absorbers 108 can be modified. The rear shock absorbers 108 are controlled via the rear fill solenoid valve 130 and the rear gate solenoid valve 128. When the rear fill solenoid valve 130 and the rear gate solenoid valve 128 are energized, air pressure to the rear shock absorbers 108 can be modified. The front and rear gate solenoid valves 126, 128 can be activated to isolate the left side of the vehicle 100 from the right side of the vehicle 100.

The automatic ride control system is also under the control of a vehicle ignition switch 142 and a suspension control switch 144 which must be turned to the off position when the vehicle 100 is to be hoisted, jacked, towed, jump-started or raised off the ground.

In existing suspension systems including controllable shocks and springs, adjustments may be manually controlled by the operator of the vehicle. Automatic control is also utilized to control the shocks and springs in response to inputs from the vehicle as well. For example, the lateral acceleration of the vehicle may be determined and compared to a threshold to determine whether to make adjustments to the vehicle suspension. Unfortunately, known suspension control systems do not utilize the relation of the speed of the vehicle to lateral acceleration in making suspension adjustment decisions.

This problem is overcome by the speed dependent suspension control of the present application by utilizing the sensed speed of the vehicle to both calculate the lateral acceleration and to determine thresholds to which the calculated lateral acceleration is compared to determine whether to make suspension adjustments or not. The suspension adjustments performed by the present invention are switching the shock absorbers 108 from soft to firm and back, and closing the gate solenoid valves 126, 128 and reopening the gate solenoid valves 126, 128.

Switching the shock absorbers 108 from soft to firm and closing the gate solenoid valves 126, 128 are to improve handling. Firmer damping by the shock absorbers 108 reduces relative movement between the body 102 and the wheels 104 of the vehicle 100. And closing the gate solenoid valves 126, 128 provides pneumatic isolation of the left and right sides of the vehicle 100. Separating the left and right shock absorbers eliminates the transfer of air from left to right and vice versa allowing a pressure differential to be generated. In a turn, the increased pressure in the two outermost shock absorbers raises the two outer wheel spring rates, decreasing vehicle roll.

Figure 2:
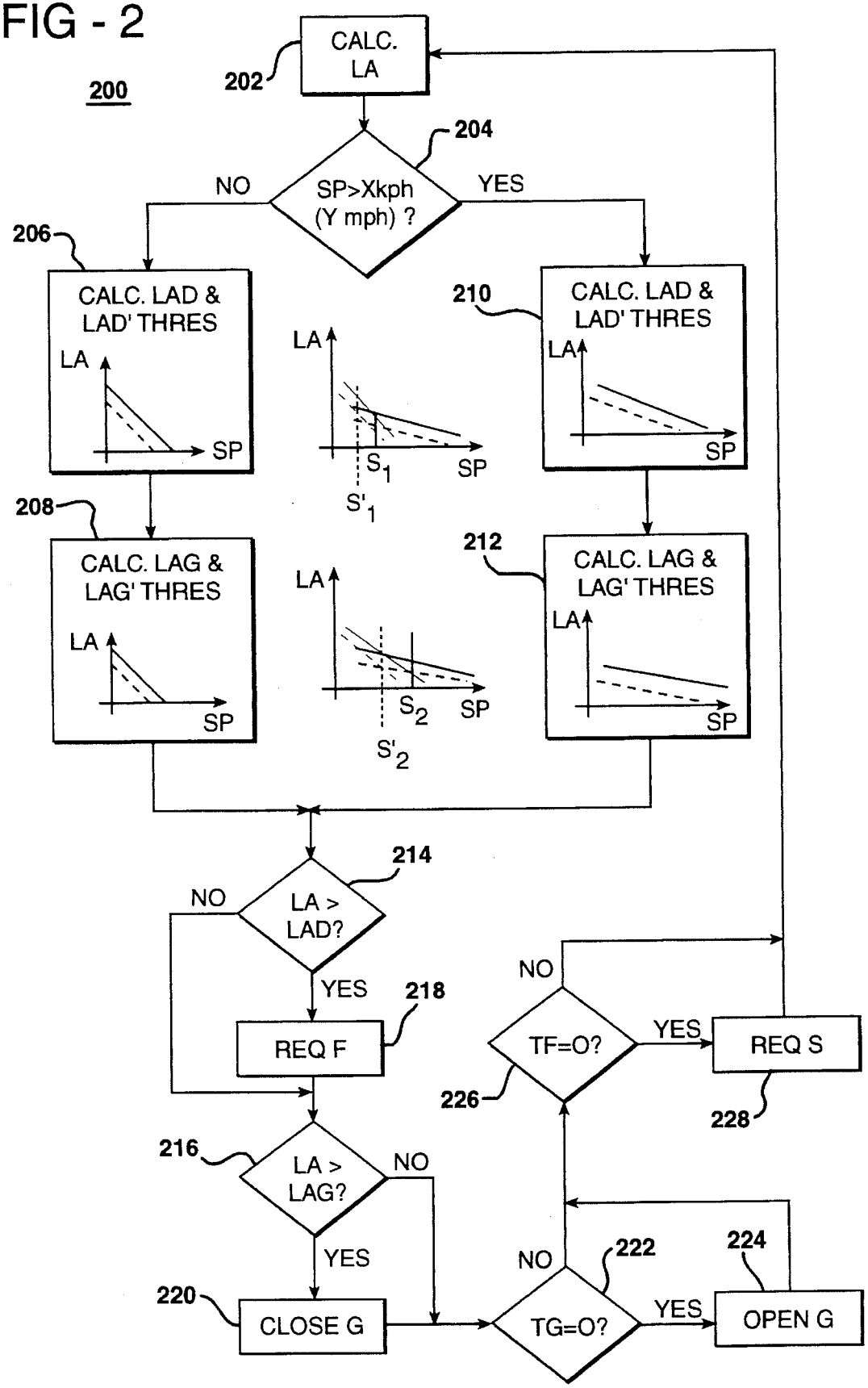
FIG. 2 is a flow chart showing illustrative steps for performing one embodiment of the invention of the present application.

Speed dependent suspension control will now be described with reference to FIG. 2 which is a flow chart 200 showing illustrative steps for operation of the invention. The initial step in the illustrative procedure of FIG. 2 is to calculate the lateral acceleration of the vehicle, see block 202. Lateral acceleration is calculated using the following equation:

$$LA=((0.6818^2 \cdot V^2 \cdot \Phi)/GR)/((57.3 \cdot L \cdot g)+(K \cdot 0.6818^2 \cdot V^2))$$

where:

$\Phi$ is the steering wheel angle in degrees;

GR is the steering gear ratio;

L is the wheel base in feet;

V is the vehicle velocity in miles per hour;

g is the acceleration of gravity; and

K is the understeer gradient.

After calculating the lateral acceleration (LA), the speed is determined as being less than or equal to a selected speed, for example 40 miles per hour (64.5 kilometers per hour), or greater than the selected speed, see block 204. Speed dependent thresholds are then determined by utilizing equations, linear equations as illustrated. A single selected speed is illustrated in FIG. 2 which, in effect, divides operation of the vehicle 100 into a low speed range and a high speed range. It is noted that two or more selected speeds could be used to increase the ranges of operation of the vehicle 100, i.e. three ranges for two selected speeds, four ranges for three selected speeds, etc.

As illustrated, if the speed is less than or equal to the selected speed, a first linear damping equation, $Y=M_1 x+B_1$, is used to calculate a lateral acceleration damping (LAD) threshold; and, a first linear gating equation, $Y=M_2 x+B_2$, is used to calculate a lateral acceleration gating (LAG) threshold, see blocks 206, 208.

If the speed is greater than the selected speed, a second linear damping equation, $Y=M_3 x+B_3$, is used to calculate the lateral acceleration damping (LAD) threshold; and, a second linear gating equation, $Y=M_4 x+B_4$, is used to calculate the lateral acceleration gating (LAG) threshold, see blocks 210, 212.

As can be seen between the blocks 206 and 210, if the first and second linear damping equations are combined they result in a piecewise linear graph with a break point at the intersection of the first and second linear damping equations, i.e. at the selected speed $S_1$. A similar result occurs for the combination of the first and second linear gating equations as can be seen between the blocks 208, 212. Here the speed $S_2$ selected for control of the gate solenoid valves 126, 128 is different than the selected speed $S_1$ for damping rate control. Examples of the constants for these threshold calculating equations for one working embodiment are as follows:

$M_1=0.0250$ and $B_2=0.24$;

$M_2=0.095$ and $B_3=0.316$;

$M_3=0.0095$ and $B_3=0.335$; and $M_4=0.0110$ and $B_4=0.413$.

After the lateral acceleration damping (LAD) threshold and lateral acceleration gating (LAG) threshold have been determined, the lateral acceleration (LA) is compared to these thresholds to determine whether suspension control action is needed, see blocks 214, 216. If the LA is greater than LAD, a request for a firmer damping factor for the shock absorbers 108 is generated, see the block 218. If the LA is greater than the LAG, the gate solenoid valves 126, 128 are closed, see the block 220.

In the currently preferred embodiment of the invention, once the gate solenoid valves 126, 128 are closed, they remain closed for a given period of time. Each time a request for closure of the gate solenoid valves 126, 128 is made, either via the block 220 or by some other component of the overall suspension system of the vehicle 100, a gate valve counter in the computer controller 106 is set to one of possibly a number of values to be down-counted by the computer controller 106 in the period of time corresponding to the setting of the gate valve counter, typically 1 to 5 seconds or so.

As long as conditions are such that a request for closure of the gate solenoid valves 126, 128 is in effect, either via the block 220 or by some other component of the overall suspension system of the vehicle 100, the gate valve counter in the computer controller 106 is stopped. As soon as the conditions change such that a request for closure of the gate solenoid valves 126, 128 is no longer in effect, the gate valve counter is down-counted by the computer controller 106 such that the gate valve counter reaches 0 upon expiration of the period of time corresponding to the setting of the gate valve counter.

Thus, after a request for closure of the gate valves 126, 128 is encountered, the gate solenoid valves 126, 128 are closed, the gate valve counter is set to a given value and, once the conditions leading to the request are no longer in effect, the gate valve counter is down-counted until the gate valve counter is equal to zero as checked in the block 222. If the gate valve counter is equal to zero, the gate solenoid valves 126, 128 are opened, see the block 224. As should be apparent, if multiple requests are made for closure of the gate solenoid valves 126, 128, the request with the maximum time will determine how long the-gate solenoid valves are closed. Also, each new incoming closure request resets the gate valve counter.

In a similar manner, once the shock absorbers 108 are set to firm, it is currently preferred to reset or set them to soft after a period of time corresponding to the setting of a damping counter. Here again, setting the shock absorbers 108 to firm may be requested by one or more other components of the overall suspension system of the vehicle 100 and the ultimate time in the firm damping mode is determined by the specific requesting component. If a request is made, the shock absorbers 108 are set to firm, the damping counter set to a given value and, once the conditions leading to the request are no longer in effect, the damping counter is down-counted until the damping counter is equal to zero at which time a request to switch the shock absorbers 108 to soft is issued, see blocks 226 228.

It is also possible to reopen the gate valve valves 126, 128 and to switch the shock absorbers 108 from firm to soft based on a gate valve open lateral acceleration gating (LAG') threshold and a switch back lateral acceleration damping (LAD') threshold. The calculations of these thresholds are performed the same as for the lateral acceleration damping (LAD) threshold and lateral acceleration gating (LAG) threshold as described above and is illustrated by the dashed lines in blocks 206–212 and the graphs between the blocks 206 and 210, and between the blocks 208 and 212.

Figure 3:
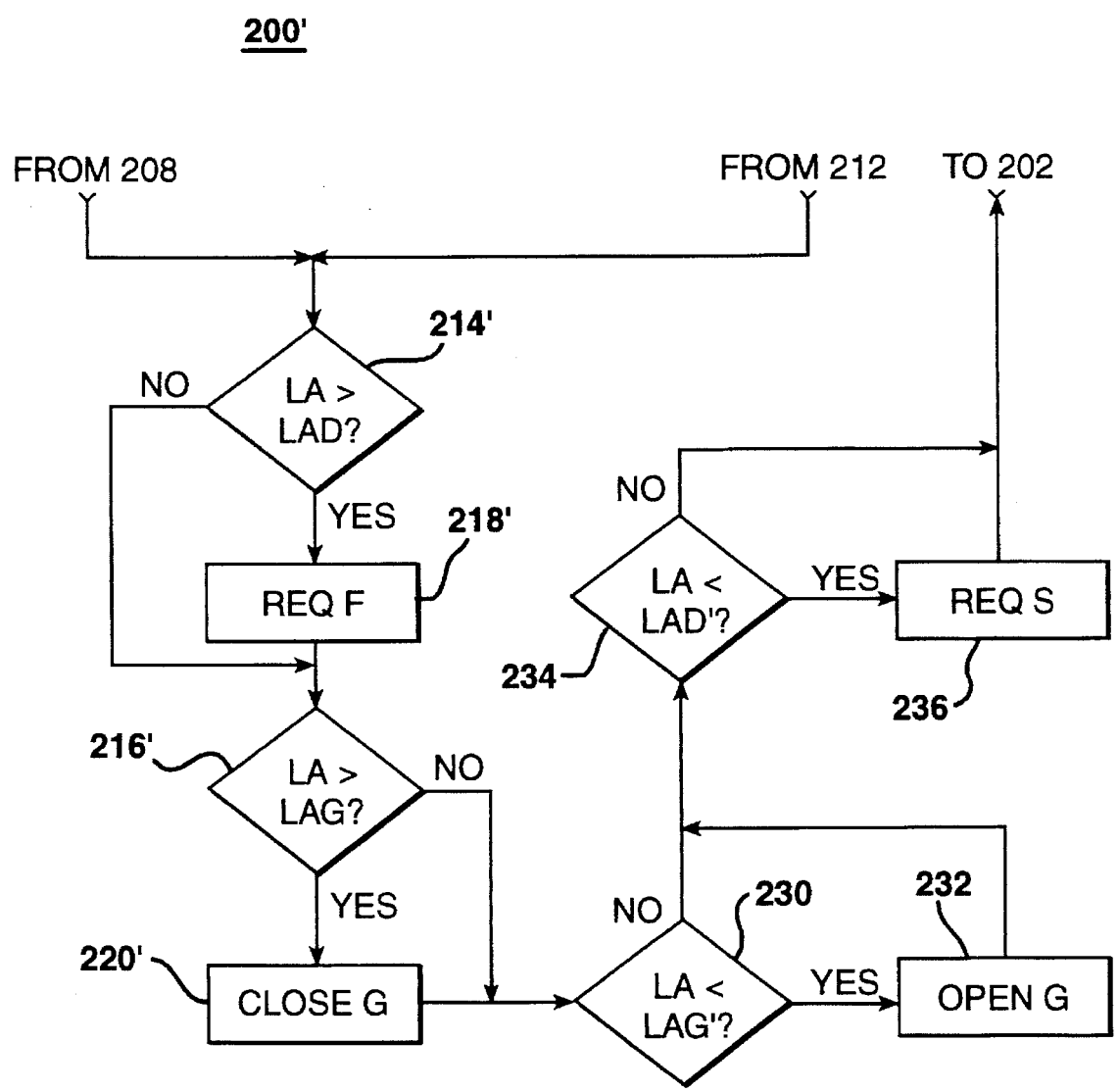
FIG. 3 is a flow chart showing illustrative steps for performing an alternate embodiment of the invention of the present application.

While operation using the gate valve open lateral acceleration gating (LAG') threshold and the switch back lateral acceleration damping (LAD') threshold should be apparent from the foregoing description, for sake of clarity, that operation will now be described with reference to FIG. 3. The flow chart of FIG. 3 includes altered steps for interconnecting blocks 208 and 212 to 202 of FIG. 2. Similar blocks are labeled with the same numerals which have been primed.

For operation with the gate valve open lateral acceleration gating (LAG') threshold and the switch back lateral acceleration damping (LAD') threshold, the calculated lateral acceleration is compared to the gate valve open lateral acceleration gating (LAG') threshold. The gate solenoid valves 126, 128 are opened if the calculated lateral acceleration is less than the gate valve open lateral acceleration gating (LAG') threshold, see blocks 220', 230, 232.

The calculated lateral acceleration is then compared to the switch back lateral acceleration damping (LAD') threshold, see block 234. A request to switch the shock absorbers 108 to soft is issued if the calculated lateral acceleration is less than the switch back lateral acceleration damping (LAD') threshold, see block 236.

Switching of the shock absorbers 108 from firm to soft and from soft to firm is preferably performed at substantially zero velocity of the shock absorbers to prevent vehicle body motions which may be sensed by the operator of the vehicle 100. While a number of arrangements for sensing shock absorber zero velocity will be apparent to those skilled in the art, an appropriate shock absorber sensing arrangement is disclosed in U.S. Pat. application Ser. No. 08/356,988, which is entitled *Damping Factor Switching in Vehicle Shock Absorbers*, was filed on Dec. 6, 1994 and is assigned to the same assignee as the present application.

Having thus described the invention of the present application in detail and by reference to preferred embodiments thereof, it will be apparent that modifications and variations are possible without departing from the scope of the invention defined in the appended claims.

What is claimed is:

1. A method for operating a controllable suspension connected between a body and wheels of a vehicle, said method comprising the steps of:

sensing the speed of the vehicle;

determining a lateral acceleration damping threshold for switching a damping factor of said controllable suspension in response to the sensed speed of the vehicle by performing the steps of:

determining whether the sensed speed of said vehicle is less than or equal to a first speed, or greater than said first speed;

solving a first damping equation, dependent upon the sensed speed of said vehicle, if the sensed speed of said vehicle is less than or equal to said first speed; and solving a second damping equation, dependent upon the sensed vehicle speed and different than said first damping equation, if the sensed speed of said vehicle is greater than said first speed;

determining the lateral acceleration of the vehicle;

comparing the determined lateral acceleration of the vehicle to said lateral acceleration damping threshold; and setting the damping factor of said controllable suspension in response to the result of said step of comparing the determined lateral acceleration of the vehicle to said lateral acceleration damping threshold.

2. A method for operating a controllable suspension as claimed in claim 1 wherein the step of determining the lateral acceleration of the vehicle comprises the steps of:

sensing an angular position of a steering wheel of said vehicle; and combining the sensed angular position of said steering wheel with the sensed speed of said vehicle to determine the lateral acceleration of said vehicle.

3. A method for operating a controllable suspension as claimed in claim 1 wherein said suspension comprises four shock absorbers having controllably variable damping rates, one of said shock absorbers being positioned at each corner of said vehicle, and the step of setting the damping factor of said controllable suspension comprises the step of switching said shock absorbers toward a firmer damping factor if the determined lateral acceleration of the vehicle exceeds said lateral acceleration damping threshold.

4. A method for operating a controllable suspension as claimed in claim 3 wherein said step of setting the damping factor of said controllable suspension further comprises the step of switching said shock absorbers toward a less firm damping factor after a defined period of time each time said shock absorbers are switched to a firmer damping factor.

5. A method for operating a controllable suspension as claimed in claim 3 further comprising the steps of:

determining a switch back lateral acceleration damping threshold;

comparing the determined lateral acceleration of the vehicle to said switch back lateral acceleration damping threshold; and switching said shock absorbers toward a softer damping factor if the determined lateral acceleration of the vehicle falls below said switch back lateral acceleration damping threshold.

6. A method for operating a controllable suspension as claimed in claim 1 wherein said suspension comprises four shock absorbers having controllably variable damping rates, one of said shock absorbers being positioned at each corner of said vehicle, and the step of setting the damping factor of said controllable suspension comprises the step of switching said shock absorbers toward a softer damping factor if the determined lateral acceleration of the vehicle falls below said lateral acceleration damping threshold.

7. A method for operating a controllable suspension as claimed in claim 1 further comprising the steps of:

determining a lateral acceleration gating threshold for switchably isolating a left side of said controllable suspension from a right side of said controllable suspension;

comparing the determined lateral acceleration of the vehicle to said lateral acceleration gating threshold; and controlling the isolation of said left side of said controllable suspension from said right side of said controllable suspension in response to the step of comparing the determined lateral acceleration of the vehicle to said lateral acceleration gating threshold.

8. A method for operating a controllable suspension as claimed in claim 7 wherein said suspension comprises four air controlled elements, one of said air controlled elements being positioned at each corner of said vehicle with the front two elements being connected together through a front gate valve and the rear two elements being connected together through a rear gate valve, and said step of controlling the isolation of said left side of said controllable suspension from said right side of said controllable suspension comprises the step of controlling said front and rear gate valves.

9. A method for operating a controllable suspension as claimed in claim 8 wherein said step of controlling said front and rear gate valves comprises closing said front and rear gate valves if the determined lateral acceleration of the vehicle exceeds said lateral acceleration gating threshold.

10. A method for operating a controllable suspension as claimed in claim 9 wherein said step of controlling said front and rear gate valves further comprises opening said front and rear gate valves after a defined period of time each time said front and rear gate valves are closed.

11. A method for operating a controllable suspension as claimed in claim 7 wherein said step of determining a lateral acceleration gating threshold comprises the steps of:

solving a first gating equation if the sensed speed of said vehicle is less than or equal to a first speed; and solving a second gating equation if the sensed speed of said vehicle is greater than said first speed.

12. A method for operating a controllable suspension connected between a body and wheels of a vehicle, said method comprising the steps of:

sensing the speed of the vehicle;

determining a lateral acceleration gating threshold for switchably isolating a left side of said controllable suspension from a right side of said controllable suspension by performing the steps of:

determining whether the sensed speed of said vehicle is less than or equal to a first speed, or greater than said first speed;

solving a first gating equation, dependent upon the sensed speed vehicle, if the sensed speed of said vehicle is less than or equal to said first speed; and solving a second gating equation, dependent upon the sensed vehicle speed and different than said first gating equation, if the sensed speed of said vehicle is greater than said first speed;

determining the lateral acceleration of the vehicle;

comparing the determined lateral acceleration of the vehicle to said gating threshold; and controlling the isolation of said left side of said controllable suspension from said right side of said controllable suspension in response to the step of comparing the determined lateral acceleration of the vehicle to said gating threshold.

13. A method for operating a controllable suspension as claimed in claim 12 wherein the step of determining the lateral acceleration of the vehicle comprises the steps of:

sensing an angular position of a steering wheel of said vehicle; and combining the sensed angular position of said steering wheel with the sensed speed of said vehicle to determine the lateral acceleration of said vehicle.

14. A method for operating a controllable suspension as claimed in claim 13 wherein said controllable suspension comprises four air controlled elements, one of said air controlled elements being positioned at each corner of said vehicle with the front two elements being connected together through a frost gate valve and the rear two elements being connected together through a rear gate valve, and said step of controlling the isolation of said left side of said controllable suspension from said right side of said controllable suspension comprises the step of controlling said front and rear gate valves.

15. A method for operating a controllable suspension as claimed in claim 14 wherein said step of controlling said front and rear gate valves comprises closing said front and rear gate valves if the determined lateral acceleration of the vehicle exceeds said lateral acceleration gating threshold.

16. A method for operating a controllable suspension as claimed in claim 15 wherein said step of controlling said front and rear gate valves further comprises opening said front and rear gate valves after a defined period of time each time said front and rear gate valves are closed.

17. A method for operating a controllable suspension as claimed in claim 15 further comprising the steps of:

determining a gate valve open lateral acceleration gating threshold;

comparing the determined lateral acceleration of the vehicle to said gate valve open lateral acceleration gating threshold; and said step of controlling said front and rear gate valves further comprises opening said front and rear gate valves if the determined lateral acceleration of the vehicle falls below said gate valve open lateral acceleration gating threshold.

18. A method for operating a controllable suspension as claimed in claim 12 further comprising the steps of:

determining a gate valve open lateral acceleration gating threshold;

comparing the determined lateral acceleration of the vehicle to said gate valve open lateral acceleration gating threshold; and controlling the isolation of said left side of said controllable suspension from said right side of said controllable suspension in response to the step of comparing the determined lateral acceleration of the vehicle to said gate valve open lateral acceleration gating threshold.

* * * * *